United States Patent
DeBo et al.

(10) Patent No.: US 10,296,502 B1
(45) Date of Patent: *May 21, 2019

(54) SELF-MANAGEMENT OF DATA APPLICATIONS

(71) Applicant: STATE FARM MUTUAL AUTOMOBILE INSURANCE COMPANY, Bloomington, IL (US)

(72) Inventors: Gregory James DeBo, Normal, IL (US); Vaidya Balasubramanian Pillai, Springfield, IL (US); Randy Reiff, Bloomington, IL (US); Mary Jane Sheley, Lincoln, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 207 days.

This patent is subject to a terminal disclaimer.

(21) Appl. No.: 14/834,033

(22) Filed: Aug. 24, 2015

(51) Int. Cl.
*G06F 17/30* (2006.01)
*G06F 16/23* (2019.01)
*G06F 16/215* (2019.01)
*G06F 16/958* (2019.01)

(52) U.S. Cl.
CPC ........ *G06F 16/2365* (2019.01); *G06F 16/215* (2019.01); *G06F 16/958* (2019.01); *G06F 17/3089* (2013.01); *G06F 17/30303* (2013.01); *G06F 17/30371* (2013.01)

(58) Field of Classification Search
CPC ......... G06F 17/30289; G06F 17/30371; G06F 17/30303; G06F 17/3089; G06F 17/2241; G06F 17/30442; G06F 17/30463; G06F 17/30466
See application file for complete search history.

(56) References Cited

U.S. PATENT DOCUMENTS

| 7,703,123 | B2 | 4/2010 | Vail et al. |
| 2002/0049740 | A1 | 4/2002 | Arning et al. |
| 2003/0005109 | A1* | 1/2003 | Kambhammettu ... G06F 11/302 709/224 |
| 2003/0233431 | A1* | 12/2003 | Reddy ..................... G06F 9/466 709/221 |

(Continued)

OTHER PUBLICATIONS

Sharon Dooley, "SQL Server 2008 Policy-Based Management", Jun. 2009, 55 pages.

*Primary Examiner* — James E Richardson
(74) *Attorney, Agent, or Firm* — Marshall, Gerstein & Borun LLP; Randall G. Rueth

(57) ABSTRACT

The present embodiments relate generally to the enforcement of guidelines, standards, and best practices for software applications. According to certain aspects, a method of retrieving, by a self-management engine from a data storage device, health data indicative of a utilization of a collection of data by one or more computing devices is disclosed, including detecting, by the self-management engine, a pattern in the utilization of the collection of data based on the health data; automatically determining, by the self-management engine, a correction to be applied to the collection of data based on the detected pattern and based on one or more rules corresponding to the detected pattern; and causing, by the self-management engine, the correction to be applied to the collection of data.

20 Claims, 6 Drawing Sheets

(56) References Cited

U.S. PATENT DOCUMENTS

| | | | |
|---|---|---|---|
| 2004/0006614 A1* | 1/2004 | DiFalco | H04L 41/0893 709/223 |
| 2005/0278587 A1* | 12/2005 | Breitling | G06Q 10/00 714/48 |
| 2006/0048017 A1* | 3/2006 | Anerousis | G06F 11/1438 714/47.2 |
| 2007/0043786 A1* | 2/2007 | DiFalco | G06Q 10/06 |
| 2007/0250517 A1* | 10/2007 | Bestgen | G06F 17/30312 |
| 2008/0256024 A1* | 10/2008 | Downer | G06F 17/30463 |
| 2009/0024572 A1* | 1/2009 | Mehta | G06F 17/30463 |
| 2010/0223499 A1* | 9/2010 | Panigrahy | G06F 11/0709 714/19 |
| 2010/0229157 A1* | 9/2010 | Ergan | G06F 11/0748 717/128 |
| 2010/0274573 A1* | 10/2010 | Feied | G06Q 50/22 705/2 |

* cited by examiner

Self-Management Rules

134

| Pattern | Action |
|---|---|
| • Lock escalations | • Set LOCKMAX 0 |
| • High cost of data sharing | • Increase page sizes |
| • Concurrency problems | • Move tables accessed by the application to the same database<br>• Provide a private database for an application that creates private tables<br>• Create tables together in a segmented table space |
| • Hash overflow | • Allocate additional space for table space |
| ⋮ | ⋮ |

*FIG. 2*

Database - Best Practices, Guidelines, and Standards

- Prefer automatic storage to DMS tables spaces.
- Use CIO or DIO in table spaces.
- Use table spaces with 8KB or 16KB page sizes.
- Create additional buffer pools for each page size used in table spaces.
- Explicitly set the size of buffer pools.
- Use a numeric data type over a character data type.
- Store data definitions as a domain value in a data modeling tool.
- Use range-clustered tables for tightly clustered data.
- Use table partitioning to logically organize tables.
- Partition tables with large-scale data by both range partitioning and multidimensional clustering.
- Use columns that best match with the most frequent used queries as index keys.
- Use partitioned indexes for partitioned tables.
- Create clustered index on columns that have range predicates.
- Eliminate indexes that are never accessed.
- Use archive logging in production environments.
- Use data and index compression.
- Keep index compression enabled
- Use value compression in tables with many column values equal to the system default values or NULL.
- ...
- ...
- ...

SELF-MANAGEMENT OF DATA APPLICATIONS

CROSS-REFERENCE TO RELATED APPLICATIONS

The present application is related to co-pending U.S. patent application Ser. No. 14/483,553, entitled "AUTOMATED GOVERNANCE OF DATA APPLICATIONS" and filed on Sep. 11, 2014, the contents of which are hereby incorporated by reference in their entirety.

TECHNICAL FIELD

The present disclosure generally relates to the enforcement of guidelines, standards, and best practices for software applications and, more particularly, to a method for automatically generating and applying corrections to collections of data such that compliance with guidelines, standards, and best practices is maintained.

BACKGROUND

Databases or other software applications that fail to adhere to guidelines and best practices pose a threat to the stability and availability of systems implementing those applications. For example, a database application, such as an application utilizing DB2® Database Software, might support a customer-facing web interface requiring the database application to maintain constant availability, such as in the case of ecommerce, insurance claim processing, technical support, cloud service, etc. interfaces. When such an application or system implementing the application becomes unavailable, a company can lose significant amounts of money in a short period of times (e.g., $800,000/hour or more).

Manually monitoring and enforcing standards, guidelines and best practices across all systems and applications operated by a company is very expensive and time consuming. As a result, many administrators or managers of enterprise applications/systems rely on random checks of data or system logs to ensure adherence to standards (e.g., after noticing problems in a production environment). This checking might identify some deviations from standards, guidelines, and best practices, but many costly problems can still occur due to the retroactive and unfocused nature of this solution.

SUMMARY

In one embodiment, a method may include retrieving, by a self-management engine from a data storage device, health data indicative of a utilization of a collection of data by one or more computing devices and detecting, by the self-management engine, a pattern in the utilization of the collection of data based on the health data. The method may also include automatically determining, by the self-management engine, a correction to be applied to the collection of data based on the detected pattern and based on one or more rules corresponding to the detected pattern. Additionally, the method may include causing, by the self-management engine, the correction to be applied to the collection of data.

In another embodiment, a system may include a non-transitory computer-readable medium storing instructions thereon, and one or more processors specially configured by the instructions stored on the non-transitory computer-readable medium. The instructions may cause the one or more processors to (i) receive health data indicative of a utilization of a collection of data by one or more computing devices executing one or more applications, (ii) detect a pattern in the utilization of the collection of data based on the health data, (iii) automatically determine a correction to be applied to at least one of the collection of data or the one or more applications based on the detected pattern and based on one or more rules corresponding to the detected pattern, and (iv) cause the correction to be applied to the at least one of the collection of data or the one or more applications. In a further embodiment, a computer readable storage medium may include non-transitory computer readable instructions stored thereon. The instructions may specially configure one or more processors such that, when executed by the one or more processors, the instructions may cause the one or more processors to (i) retrieve health data indicative of a utilization of a collection of data by one or more computing devices executing one or more applications, (ii) detect a pattern in the utilization of the collection of data based on the health data, (iii) automatically determine a correction to be applied to at least one of the collection of data or the one or more applications based on the detected pattern and based on one or more rules corresponding to the detected pattern, and (iv) cause the correction to be applied to the at least one of the collection of data or the one or more applications.

BRIEF DESCRIPTION OF THE DRAWINGS

FIG. 2 is a list of example self-management rules which may be utilized by the self-management server illustrated in the computing environment of FIG. 1;

FIG. 3 is a list of example guidelines, standards, and best practices according to which the self-management rules illustrated in FIG. 2 may be defined;

DETAILED DESCRIPTION

Figure 1:
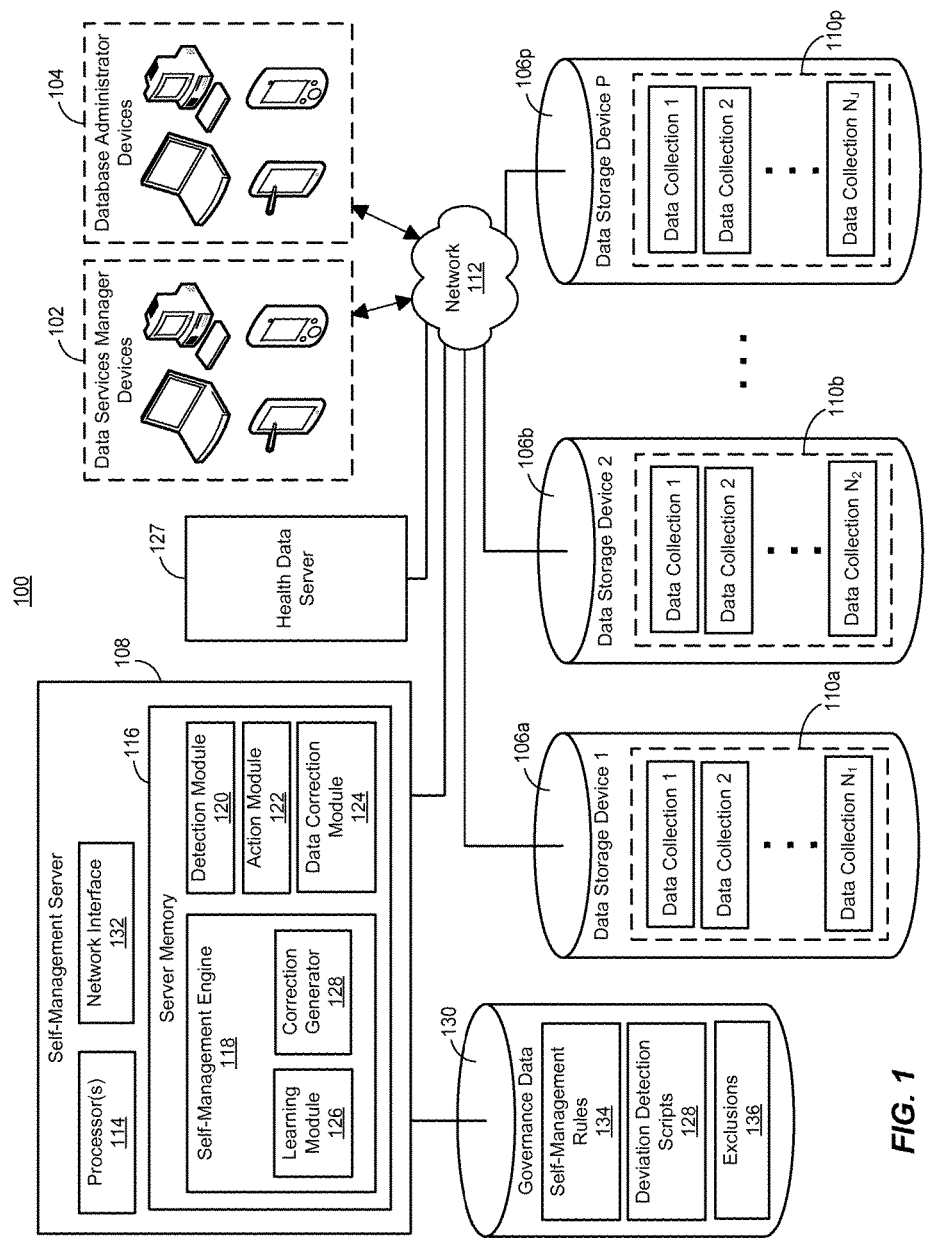
FIG. 1 is a block diagram of an example computing environment for automatically detecting patterns in the usage of a plurality of data collections and generating and applying corrections in response to the detected patterns.
Figure 4:
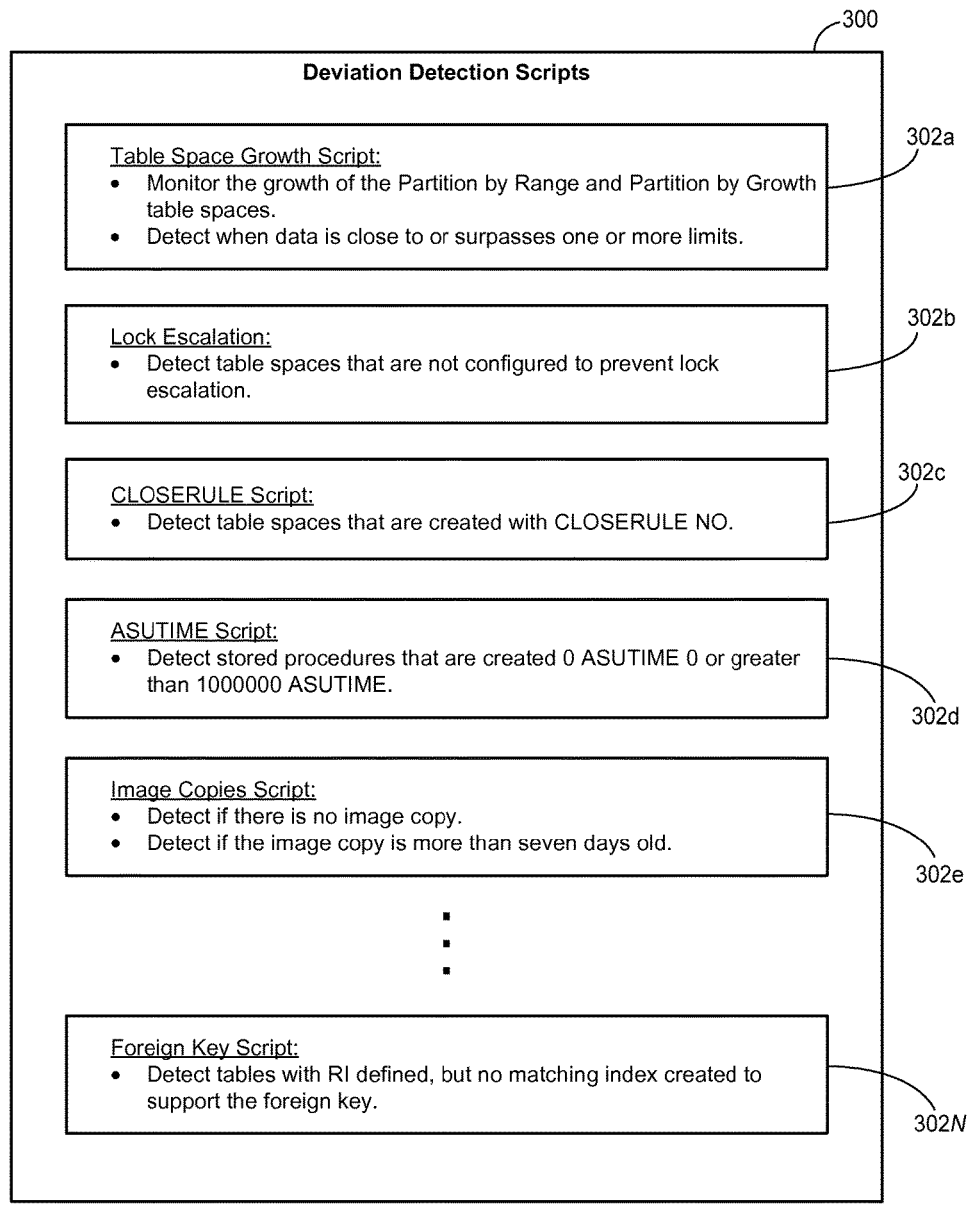
FIG. 4 is a block diagram of example deviation detection scripts which may be utilized in the computing environment illustrated in FIG. 1 to maintain compliance with generated corrections.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

As used herein, the terms "guidelines," "best practices," and "standards" are hereby defined to mean any of a number of rules, principles, pieces of advice, proven methods or techniques, requirements, norms, etc. related to software applications and computing systems. Guidelines, best practices, and standards may include database best practices, best coding practices, company-specific application guidelines or standards, formats or standards of data transfer, software protocols, image or graphics rendering standards, etc. Also as used herein, the term "deviation" is hereby defined to mean any of a number of deliberate or accidental divergences from one or more guidelines, standards, or best practices. Deviations may include a misuse of a software application, a storage of data that does adhere to standards, a use of data that does not adhere to standards, etc. Still further, as used herein, the term "pattern" is hereby defined to mean any of a number of trends, singular events, recurring events, irregularities, erratic operations, departures from known or preferred operations, etc. occurring in the usage of data collections (e.g., utilization in an execution of one or more applications). Patterns may include an error being output in every instance of an application, a high (e.g., above a threshold) memory usage during the execution of an application, a trend of increased execution times for application utilizing certain collections of data, etc.

Although database applications and data stored in databases are emphasized below, some implementations of the systems and methods discussed herein may facilitate a self-management of any number of software applications other than database applications. For example, the techniques of the present disclosure may allow the automated governance of software applications related to ecommerce, billing, content management, information technology (IT), customer relationship management, marketing, analytics, project management, manufacturing, process control, procurement, social collaboration, data warehousing, facilities management, security, mobile applications, visualization, infrastructure management, etc., which software applications are not tied to any particular database and/or which software applications generate necessary data, input, etc. "on-the-fly" or in near real time.

System Overview

FIG. 1 illustrates an example computing environment 100 for self-managing databases, or other software applications. The example computing environment 100 includes one or more data services manager devices 102, one or more database administrator devices 104, one or more data storage devices 106a-106p, and a self-management server 108. In an implementation, the self-management server 108 may automatically detect patterns in the utilization of and generate corresponding corrections for a plurality collections of data 110a-110p stored on the data storage devices 106a-106p (e.g., in a distributed or otherwise segmented manner). These corrections may include, by way of example, alterations of the content or structure of the collections of data 110a-110p, alterations of applications or programs (e.g., Structured Query Language, or SQL, queries into the collections of data 110a-110p), adjustment of parameters utilized to define databases or interactions with (e.g., transfers in/out of) databases, etc. The self-management server 108 may, in some cases, apply corrections to the plurality collections of data 110a-110p and/or to applications utilizing the plurality collections of data 110a-110p.

In some implementations, the self-management server 108 may be disposed at a physical location different from the physical location of each of the data storage devices 106a-106p. Further, each of the data storage devices 106a-106p may be disposed at a different physical location than any other of the data storage devices 106a-106p, or some or all of the data storage devices 106a-106p may be disposed at the same physical location. For example, the data storage devices 106a-106p may be disposed at a plurality of data centers across the United States or even across the world. In any event, the self-management server 108 can access (execute scripts on, alter data stored on, etc.) each of the data storage devices 106a-106p via a network 112. Thus, the self-management server 108 may monitor the utilization of the data storage devices 106a-106p from a central location (e.g., that of the self-management server 108) without a need for separate servers to monitor the utilization of each of the data storage devices 106a-106p. Although, a certain number P data storage devices are illustrated in FIG. 1, a computing environment for self-managing databases, or other software applications, may include any suitable number of data storage devices each storing any suitable number of data collections.

The data services manager devices 102 may include mobile or stationary computing devices such as smartphones, tablet computers, laptop computers, desktop computers, personal digital assistants, smartwatches, head-mounted computing devices, etc. Operators of the data services manager devices 102 may include individuals (e.g., employees of a company) tasked with the management of a variety of database applications, for example. The self-management server 108 may provide such individuals with indications of the corrections of (e.g., alterations of) the plurality collections of data 110a-110p and/or the correction of applications utilizing the plurality collections of data 110a-110p via user interfaces (touchscreens, displays, etc.) of the data services manager devices 102, in an implementation. Additionally, operators of the data services manager devices 102 may interact directly with the self-management server 108 to modify, monitor, or interact with applications/modules executing on the self-management server 108 or data accessible through the self-management server 108 (e.g., the collections of data 110a-110p).

The database administrator devices 104 may include devices substantially similar to those included in the data services manager devices 102. Operators of the database administrator devices 104 may include individuals responsible for administering, creating, manipulating, running code utilizing, or otherwise "touching" one or more of the collections of data 110a-110p. That is, an operator of one of the database administrator devices 104 may include one or more individuals that "own," are responsible for, or are primarily associated with one of the collections of data 110a-110p. The self-management server 108 may provide such individuals with indications of the corrections of (e.g., alterations of) the plurality collections of data 110a-110p and/or the correction of applications utilizing the plurality collections of data 110a-110p via user interfaces (touchscreens, displays, etc.) of the database administrator devices 104, in an implementation. The database administrator devices 104 may also directly interact with the self-management server 108 to modify data in the collections of data 110a-110p, configure application utilizing the collections of data 110a-110p, etc.

The data services manager devices 102 and the database administrator devices 104 may communicate with the self-management server 108 via the network 112. The network 112 may be a proprietary network, a secure public Internet, a virtual private network or some other type of network, such as dedicated access lines, plain ordinary telephone lines, satellite links, combinations of these, etc. Where the network 112 comprises the Internet, data communication may take place over the network 112 via an Internet communication protocol. The network 112 may communicate with the network-enabled devices 112 through wireless or wired connections. Further, in some examples, the network 112 is a mobile (or cellular) communication network.

The self-management server 108 may include one or more central processing units (CPUs) or processors 114 (may be called a microcontroller or a microprocessor), one or more memories 116, and a system bus (not shown) that couples various system components including the memory 116 to the processors 114. The system bus may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The memory 116 may include an assortment of computer-readable media, where computer-readable media may be any media that may be accessed by the self-management server 108. By way of example, and not limitation, the media may include both transitory and non-transitory media, removable and non-removable media. Specifically, the memory 116 may include non-transitory media such as RAM, ROM, EEPROM, or other memory technology, optical storage disks, magnetic storage devices, and any other non-transitory medium which may be used to store computer-accessible information. In particular, the memory 116 may store one or more specially configured engines, applications or modules including a self-management engine 118, a detection module 120, an action module 122, and a data exclusion module 124. Although each of the engines/modules 118, 120, 122, and 124 are illustrated as separate modules stored in the memory 116, some implementations of the environment 100 may combine and/or separate the functionality of the engines/modules 118, 120, 122, and 124 into any number of distinct engines, modules, applications, etc.

The self-management engine 118 may specifically, or specially, configure the self-management server 108 such that, when executed by the processors 114, the self-management engine 118 may cause the one or more processors to learn patterns in the utilization of the collections of data 110a-110p and generate corrections based on the learned patterns. Specifically, the self-management engine 118 may include a learning module 126 and a correction generator 128. The learning module 126 may receive, or retrieve, health data about the utilization of the collections of data 110a-110p as input and output indications of patterns in the utilization of the collections of data 110a-110p. For example, the learning module 126 may learn and subsequently detect a pattern of certain errors, events, etc. occurring while applications, such as e-commerce, business intelligence, customer relationship management, or any other suitable applications, utilize the collections of data 110a-110p. The correction generator 128 may then automatically generate a correction (e.g., alteration) for the collections of data 110a-110p and/or the applications utilizing the collections of data 110a-110p based on the detected pattern.

A health data server 127 may generated the health data about the utilization of the collections of data 110a-110p, in some implementations. The health data server 127 may be configured to monitor the usage of the data collections 110a-110p and generate the corresponding health data. In particular, the health data server 127 may execute, via one or more processors of the health data server 127, a number of applications, modules, engines, etc. particularly configuring the health data server 127 to monitor the usage of the data collections 110a-110p and/or the data collections 110a-110p themselves. By way of example, the health data server 127 may: (i) index, search, and analyze data generated by applications using the data collections 110a-110p, such as log files, configuration files, output files, messages, alerts, scripts, metrics, etc., to produce health data indicative of application instances, completions, executing processes, failures, errors, parameters, etc.; and (ii) identify and quantify the performance of applications utilizing the data collections 110a-110p including identifying the highest resource-consuming SQL queries, generating reports about the performance of applications (execution time, memory usage, data transfer rates, etc.), summaries of collected or utilized data in the collections of data 110a-110p (e.g., by file name, amounts of data, etc.), identify the most heavily accessed data base tables and/or indices, etc. Generally, the health data server 127 may generate any suitable data in any number of formats (log files, tables, reports, lists, etc.), which may be indicative of the usage of the collections of data 110a-110p. Further, although illustrated as a separate server in possibly a separate physical location from that of the self-management server 108, some implementations of the system 100 may include only one server or other numbers of servers (three, four, etc.) that implement the functionality of the health data server 127 and/or the self-management server 108.

To detect the patterns in the utilization of the collections of data 110a-100p, the learning module 126 may utilize a number of specialized modules, algorithms, routines, etc. specifically configured to learn and detect certain patterns in the utilization of the collections of data 110a-110p. In particular, some implementations of the learning module 126 may utilize natural language processing techniques to analyze log files generated during the utilization of the collections of data 110a-110p and stored on one or more of the data storage devices 106a-106p and/or on other data storage devices. For example, the learning module 126 may classify and/or cluster various types of errors, outputs, etc. included in log files based on a calculation and comparison of "n-grams" included in the log files, where an n-gram is a sequence of n items in a log file.

Alternatively or additionally, the learning module 126 may implement one or more clustering algorithms, such as sequential or iterative clustering algorithms, to identify certain event types (e.g., errors) in log files or other suitable data generated during the utilization of the collections of data 110a-110p. For example, the learning module 126 may implement one or more similarity functions dependent on word ordering and parameters included in log files along with clustering algorithms utilizing the similarity functions, such as k-means clustering algorithms. Such a learning module 126 may cluster messages included in log files or corresponding event types (e.g., lock escalations) and create a reference table, or dictionary, of detected or detectable event types included in log files or other suitable output data.

Still further, some implementations of the learning module 126 may include specialized, and in some cases pre-programmed, routines or algorithms particularly configured to detect certain structures, phrases, symbols, characters, etc. within log files or other output data. For example, the learning module 126 may be configured to detect certain program or data objects (e.g., by name) within log files and/or detect certain templates utilized by programs to output certain types of errors, messages, etc. The learning module 126 may utilize counts, frequencies, or other measures of these program objects to detect patterns in the utilization of the collections of data 110a-110p.

In some or all of these implementations of the learning module 126, the learning module 126 may automatically and/or manually be refined or updated over time using a number of processes. For example, the learning module 126 may initially be trained on a training set of data, such as historical logs from the use of the collections of data 110a-110p or substantially similar sets of data, such that the learning module 126 accurately identifies known patterns in the training set of data. Subsequently, the learning module 126 may automatically and/or manually be refined based on newly acquired or merely different sets of data indicative of the use of the collections of data 110a-110p or substantially similar sets of data.

Although certain types of learning methods are discussed above and throughout the remainder of this description, learning modules, such as the learning module 126, may implement a combination of any number and type of learning techniques and/or pre-programmed procedures, processes, algorithms, etc. to detect patterns in the utilization of the collections of data 110a-110p. By way of example, the learning module 126 may implement a suitable combination of classification techniques (support vector machines, Bayesian networks, etc.), clustering techniques (K-means, self-organizing feature maps, Y-means, density-based spatial clustering of applications with noise, etc.), and statistical techniques (principal component analysis, feature extraction, etc.). Further, the learning module 126 may execution a combination of these and other techniques based on any suitable combination of data generated during the use of the collections of data 110a-110p (log files, configuration files, output files, etc.) and/or generated during the monitoring or configuring of the collections of data 110a-110p (e.g., a monitoring of processing efficiency, processing load, data usage, memory usage, etc. during a use of the collections of data 110a-110p).

The correction generator 128 of the self-management engine 118 may automatically generate corrections to the collections of data 110a-110p and/or to application utilizing the collections of data 110a-110p upon detections of patterns by the learning module 126. In particular, the correction generator 128 may specially configure the self-management server 108 such that one or more suggested, recommended, or appropriate corrections are generated automatically upon detections of patterns by the learning module 126. In this manner, the self-management engine 118 may substantially avoid propagation of errors within the collections of data 110a-110p and automatically regulate or improve performance (processing efficiency, data usage, reliability, etc.) of applications utilizing the collections of data 110a-110p. Further, the self-management engine 118 may reduce an amount of processor cycles, memory usage, etc. of the self-management engine 118 in managing the collections of data 110a-110p, because the self-management engine 118 is able to automatically identify and resolve errors, deviations from guidelines, etc. and maintain integrity and reliability of the collections of data 110a-110p.

In particular, the correction generator 128 may, upon receiving an indication of a pattern from the learning module 126, access a plurality of self-management rules 134 stored in a governance database 130, which self-management rules 134 allow the correction generator 128 to generate one or more recommended or appropriate corrections corresponding to the indicated pattern. The self-management rules 134 may represent various recommended, or otherwise indicated, configurations of the collections of data 110a-110p (or applications utilizing the collections of data 110a-110p) indicated in guidelines, standards, or best practices issued by providers of the software/hardware that make up the collections of data 110a-110p (or facilitate the applications utilizing the collections of data 110a-110p). Specifically, for the governance of collections of data, such as the collections of data 110a-110p, relevant guidelines, standards, and best practices may include guidelines, standards, and best practices related to: data modeling, storage systems, data types, table design, amounts of data stored, compression of data, indexing of tables, structure of databases, configuration logs, performance logs, performance monitoring and tuning, image copies of data, etc., as further discussed in U.S. patent application Ser. No. 14/483,553. Guidelines specific to a database or software application may include guidelines specifying that database administrators are to utilize data and index compression. In another example, based on guidelines and standards, database administrators may be required to limit tables to particular sizes (e.g., in terms of columns, rows, or data storage).

In some implementations, the self-management rules 134 may include a variety of conditional statements (e.g., represented in any suitable textual and/or numerical manner) based on guidelines, standards, or best practices issued by providers of the software/hardware that make up the collections of data 110a-110p (or facilitate the applications utilizing the collections of data 110a-110p). FIG. 2 illustrates example self-management rules 134 for a particular types of system (e.g., utilizing a DB2® Database). As can be seen in FIG. 2, the example self-management rules 134 may, for each of a plurality of detectable patterns (e.g., detectable by the learning module 126), define one or more actions. These actions may include alterations of data, re-structuring of data, defining of parameters, modification of parameters, organization of data, modifications of database queries, modifications of configuration files corresponding to applications utilizing the collections of data 110a-110p, and/or any other number and type of actions related to the corresponding detected pattern. In some cases, the self-management rules 134 may define multiple actions corresponding to a single detectable pattern. In other cases, the self-management rules 134 may define a single action corresponding to each detectable pattern.

Although FIG. 2 illustrates one group of self-management rules 134. Self-management rules utilized by a correction generator, such as the correction generator 128, may utilize any number or groups of similar or dissimilar rules, such as a first group of rules corresponding to a first piece of hardware (e.g., first server cluster), a second group of rules corresponding to a second piece of hardware (e.g., a second server cluster), etc. and/or a first group of rules corresponding to a first data collection or database system, a second group of rules corresponding to a second data collection or database system, etc. Further, the correction generator 128 may utilize self-management rules in any suitable format and with any suitable number of conditions. That is, certain self-management rules may be dependent on multiple detected or detectable patterns. For example, a certain self-management rule may define a correction for a scenario in which a first pattern and a second pattern is detected, and another self-management rule may define a correction for a scenario in which a first, second, and third, pattern are detected.

Returning to FIG. 1, the deviation detection module 120 may, when executed by the processors 114, specially configure the self-management server 108 to detect deviations in the collections of data 110*a*-110*p*, which deviations were previously identified as patterns by the learning module 126, had corresponding corrections generated by the correction generator 128, and/or were manually identified by operators of the self-management server 108. In some implementations, the deviation detection module 120 may detect deviations from guidelines, standards, and best practices based on a plurality of deviation detection scripts 140 stored in the governance database 130, as further discussed in U.S. patent application Ser. No. 14/483,553. For example, the deviation detection module 120 may "scan" each of the collections of data 110*a*-110*p* based on the data detection scripts 140 to identify portions of each of the collections of data 110*a*-110*p* that do or do not adhere to certain guidelines, standards, and best practices. The deviation detection scripts 140 may include Structure Query Language (SQL) scripts or scripts in any other suitable programming language. In some cases, the self-management server 108 may retrieve one or more of the deviation detection scripts 140 for execution locally on the processors 114, and, in other cases, the self-management server 108 may store at least some of the deviation detection scripts 140 in the memory 116 for quick retrieval.

In some scenarios, the self-management server 108 may utilize the self-management engine 118 to automatically identify patterns and develop appropriate corrections for the identified patterns. Then an operator of the self-management server 108 may utilize the deviation detection module 120 to maintain compliance of the collections of data 110*a*-110*p* over time by enforcing the corrections automatically developed by the self-management engine 118. For example, the self-management engine 118 may generate a recommended correction to one or more of the collections of data 110*a*-110*p* which increases page sizes in certain databases. Subsequently, the deviation detection module 120 may, by utilizing a corresponding one of the deviation detection scripts 140, maintain the increased page sizes in the certain databases over time by periodically, or otherwise, detecting when page sizes in the certain databases are below an acceptable size (e.g., as defined by the correction generated by the self-management engine 118).

Generally, the collections of data 110*a*-110*p* may include data stored on the data storage device 106 (e.g., including optical storage disks, magnetic storage devices, etc.) and queried from the data storage device 106 via any suitable data structure, format, protocols, languages, etc. For example, the collections of data 110*a*-110*p* may include structured data, semi-structured data, or unstructured data stored in relational databases, object-relational databases, hierarchical databases, document-oriented databases, etc. The self-management server 108 may query, scan, or otherwise interact with the collections of data 110*a*-110*p* via languages, protocols, scripts, etc. defined according to database servers, applications, or systems such as the DB2® Database Software, Apache™ Hadoop® Software Framework, SQL Server® Relational Database Management System, Oracle® Database Object-Relational Database Management System, MongoDB® Document-Oriented Database System, etc. Additionally, the collections of data 110*a*-110*p* may include any suitable type of data such as insurance claim/policy data, user interaction data, website analytics data, customer contact data, mobile application data, product or service data, etc.

The action module 122, when executed by the processors 114, may specially configure the self-management server 108 to automatically determine and complete appropriate actions (e.g., from a set of pre-defined actions or automatically recommended by the correction generator 128) in response to one of: (i) an identification of one or more patterns by the learning module 126; or (ii) a detection of a deviation from guidelines, standards, and best practices by the deviation detection module 120. Such actions may include, by way of example, communicating electronic or other notifications to the data services manager devices 102 and/or the database administrator devices 104, marking or indicating a wait or pending status of a portion of data, automatically altering portions of data (e.g., by the data exclusion module 124), automatically altering at least some portions of applications utilizing the collections of data 110*a*-110*p*, generating an incident indication or report corresponding to a deviation, or taking no action. These and other example actions are further discussed in U.S. patent application Ser. No. 14/483,553. In general, the action module 122 may automatically trigger any suitable action involving communicating of messages, transmitting of data, manipulating of data, manipulating of applications, etc. in response to a detected deviation or an identified pattern in the utilization of the collections of data 110*a*-110*p*.

In some scenarios in which the action module 122 determines, or the correction generator 128 recommends, that a communication should be sent to the data services manager devices 102 and/or the database administrator devices 104, the self-management server 108 may send the communication to the data services manager devices 102 and/or the database administrator devices 104 via a network interface 132. As discussed with reference to FIGS. 5 and 6, the self-management server 108 may automatically trigger alterations of data/applications in response to identified patterns, in some scenarios. However, in other scenarios, the correction generator 128 may recommend corrections that require approval by certain parties (e.g., governance boards, administrators, etc.). In these scenarios, the action module 122 may generate and send communications to appropriate individuals (e.g., operating the data services manager devices 102 and/or the database administrator devices 104) via the action module 122 and the network interface 132.

The data exclusion module 124 of the self-management server 108 may, when executed by the processors 114, may specially configure the self-management server 108 to generate exclusions for certain portions of the collections of the collections of data 110*a*-110*p*, where these certain portions are not subject to identifications of patterns (e.g., by the learning module 126), detections of deviations (e.g., by the deviation detection module 120), and/or regulatory actions or corrections in response to those deviations or patterns. In an implementation, an operator of one of the data services manager devices 102 or the database administrator devices 104 may interact with the self-management server 108 (e.g., via a web interface, terminal interface, or any other suitable interface) to request that an exclusion be made for certain portions of one of the collections of data 110*a*-110*p*. In one scenario, a deviation or pattern may be known to the operator, and the operator may be taking steps to correct the deviation or pattern. If approved (e.g., automatically by the data exclusion module 124 based on certain rules, security profiles, or manually via communications generated by the exclusion module 122), the data exclusion module 124 may store indications of one or more exclusions 136 in the governance database 130. Subsequently the self-management engine 118, deviation detection module 120, and/or action module 122 may query the exclusions 136 to determine if certain portions of the collections of data 110*a*-110*p* are to be monitored, scanned, and/or if actions are to be taken with respect to deviations from standards, guidelines, and best practices or identified patterns.

Although one self-management server 108 and one governance database 130 is depicted in FIG. 1, some implementations of computing environments for self-managing collections of data may utilize different numbers of servers and data storage devices. In particular, the processing performed by the self-management server 108 may be distributed among a plurality of servers in an arrangement known as "cloud computing," and the data stored in the governance database 130 may be distributed among a plurality of data storage devices, in an embodiment. This configuration may provide several advantages, such as, for example, enabling near real-time uploads and downloads of information as well as periodic uploads and downloads of information.

Guidelines, Standards, Best Practices, and Corresponding Rules/Scripts

FIG. 3 is a list of example best practices, guidelines, and standards 200 that may be utilized by a system, such as the system 100 illustrated in FIG. 1, to self-manage and/or regulate data collections and/or applications utilizing data collections. In particular, the self-management engine 118 of the system 100 may utilize rules, such as those illustrated in FIG. 2, which rules are defined by or in accordance with the best practices, guidelines, and standards 200. That is, the actions indicated in the self-management rules 134 may cause data collections to be aligned with the best practices, guidelines, and standards 200 so as to prevent or modify the detected patterns indicated in the self-management rules 134. The best practices, guidelines, and standards 200 are given by way of example, and it is understood that a system, such as the system 100, may govern databases and software applications based on any suitable best practices, guidelines and standards relevant to those data and applications. The example list of best practices, guidelines, and standards may be applicable to only certain types of systems (e.g., DB2® Database Software systems), but self-management servers, such as the example self-management server 108, may automatically manage and/or regulate (e.g., enforce standards) for any suitable types of systems, as discussed further above.

Specifically, for the governance of collections of data, such as the collections of data 110*a*-110*p*, relevant guidelines, standards, and best practices may include guidelines, standards, and best practices related to: data modeling, storage systems, data types, table design, amounts of data stored, compression of data, indexing of tables, structure of databases, configuration logs, performance logs, performance monitoring and tuning, image copies of data, etc. For example, guidelines specific to a database or software application may include guidelines specifying that database administrators are to utilize data and index compression. In another example, based on guidelines and standards, database administrators may be required to limit tables to particular sizes (e.g., in terms of columns, rows, or data storage).

In some implementations, certain best practices, guidelines, and standards may be required while others may be optional. For example, the best practices, guidelines, and standards 200 may require that a database administrator maintains at least one image copy of stored data (e.g., for backup or recovery purposes), whereas it may only be recommended that database administrators utilize columns that best match most frequently used queries as index keys. As such, operators configuring the self-management server 108 (e.g., via specialized programming of processors or other suitable interactions) may configure the self-management server 108 to correct deviations from required or otherwise prioritized best practices, guidelines, and standards with deviation detection scripts, as discussed further in U.S. patent application Ser. No. 14/483,553, while optional or other best practices, guidelines, and standards are only enforced upon detecting corresponding learned patterns (e.g., by the self-management engine 118). In other words, the self-management server 108 may enforce some of best practices, guidelines, and standards 200 by executing pre-determined deviation detection scripts, such as the deviation detection scripts 128, and the self-management server 108 may enforce other of the best practices, guidelines, and standards 200 based on self-management rules, such as the self-management rules 134, defined by the best practices, guidelines, and standards 200, which self-management rules are only utilized in the event of a detection of corresponding pattern in the usage of data collections. Generally, the self-management server 108 may manage or regulate the data collections 110*a*-110*p* via a combination of deviation detection scripts and self-management rules, which self-management rules are utilized by a self-management engine. In fact, in some implementations, the self-management server 108 may enforce all of the best practices, guidelines, and standards 200 by detecting patterns with the learning module 126 and automatically generating appropriate corrections with the correction generator 128, without a need for pre-defined deviation detection scripts.

In any event, actions or corrections taken in response to detected patterns corresponding to each of these guidelines or deviations from each of these guidelines may differ. For example, one detected pattern (e.g., including lock escalations) may trigger an alteration of one or more parameters defining a data structure or system (e.g., setting "LOCK-MAX 0"). Another detected pattern (e.g., including has overflows) may trigger an allocation of additional space for certain database structures. A range of actions in response to patterns and deviations is further discussed in U.S. patent application Ser. No. 14/483,553. In general, each type of deviation or detected pattern may trigger a different action or correction (e.g., completed by the action module 122) based on the type of deviation, timing of the deviation, past instances of the deviation, identities of administrators corresponding to the data, etc.

To detect possible deviations from best practices, standards, and guidelines, such as the example best practices, guidelines, and standards 200, the self-management engine 118 may learn and/or identify one or more patterns in the usage of the data collections 110*a*-110*p*, as discussed further with reference to FIG. 1. Subsequently, the correction generator 128 may generate appropriate corrections to the detected patterns based on self-management rules, which rules are defined based on the best practices, standards, and guidelines. Once a correction is developed, which correction may include one or more actions defined by the self-management rules, such as those illustrated in FIG. 2, the self-management server 108 may complete actions indicated in the generated correction (e.g., via the action module 122) and/or communicate indications of the correction to one or more individual (e.g., operating the data services manager devices 102) for approval. Methods which may be utilized in this self-management of data collections based on best practices, standards, and guidelines are discussed further with reference to FIGS. 5 and 6.

Further, once generated corrections are approved and/or at any other suitable times, operators of the self-management server 108 may configure deviation detection scripts to maintain the corrections automatically generated by the self-management engine 118 and/or to maintain required best practices, standards, and guidelines for the data collections 110a-110p. For example, the deviation detection module 120 may execute the one or more deviation detection scripts 140 that query the collections of data 110a-110p. That is, each of the one or more deviation detection scripts 140 may be configured to scan data, retrieve information, locate documents, etc. so as to identify deviations from one or more of the best practices, guidelines, and standards 200 and/or previously generated corrections. In some cases, each of the deviation detection scripts 140 may be configured to search for and identify a deviation from a particular one of the best practices, guidelines, and standards 200, and, in other cases, the deviation detection scripts 140 may include scripts that locate multiple different types of deviations.

The deviation detection scripts 140 may, by way of example, include Structured Query Language (SQL) elements (queries, statements, predicates, etc.), MapReduce programs, or any other piece of computer-readable instructions used to interact with the collections of data 110a-110p. In an implementation, operators of the data services manager devices 102 may upload new and/or different scripts into the deviation detection scripts 140 or may delete scripts from the deviation detection scripts 140. For example, when a particular guideline, standard, or best practice is revised, updated, deleted, or added to the best practices, guidelines, and standards 200, an operator of one of the data services manager devices 102 may revise, update, delete, or add one of the deviation detection scripts 140 corresponding to the particular guideline, standard, or best practice. Further, when a correction is generated by the self-management engine 118 and, in some cases, approved (e.g., by a governance board), operators may generate and save a new deviation detection script 140 corresponding to the correction (which may correct a learned and identified pattern in the usage of the data collections 110a-110p). In this manner, the deviation detection functionality of the self-management server 108 may be easily updated or revised over time for all of the collections of data 110a-110p being monitored (without a need to update a deviation detection module for each of the collections of data 110a-110p).

FIG. 3 is a block diagram of one or more example deviation detection scripts 300. The deviation detection scripts 300 may be utilized by the deviation detection module 120 to detect deviations from a plurality of guidelines, standards, and best practices, for example.

The example deviation detection scripts 300 include N scripts 302a-302N, where each of the scripts 302a-302N may detect one or more deviations from guidelines, standards, and best practices, such as the example best practices, guidelines, and standards 200, or from previously generated corrections (e.g., corresponding to detected patterns). As discussed above, each of the scripts 302a-302N may be capable of detected a deviation from one particular guideline/correction or from a plurality of guidelines/corrections. For example, the script 302a may monitor the growth of table spaces and detect when the size or amount of data is close to or surpasses one or more limits or thresholds. Another script 302e may detect both a lack of any image copy and an outdated image copy (e.g., created more than seven days prior to the execution of the script 302e).

In some implementations, each of the scripts 302a-302N may execute on one of the collections of data 110a-110p at a time, whereas, in other implementations, at least some of the scripts 302a-302N may execute on multiple of the collections of data 110a-110p simultaneously. Further, the self-management server 108 may execute all of the scripts 302a-302N simultaneously or sequentially at periodic times (e.g., once a week), when triggered by one of the data services manager devices 102, or at any suitable non-periodic times (e.g., four time a month when network traffic is below a threshold). It is understood, however, that the self-management server 108 may execute each of the scripts 302a-302N at any suitable time independent of other of the scripts 302a-302N, and the self-management server 108 may execute all or some of the scripts 302a-302N on portions of one or more of the collections of data 110a-110p independently of other portions of the collections of data 110a-110p.

Self-Management Methods

Figure 5:
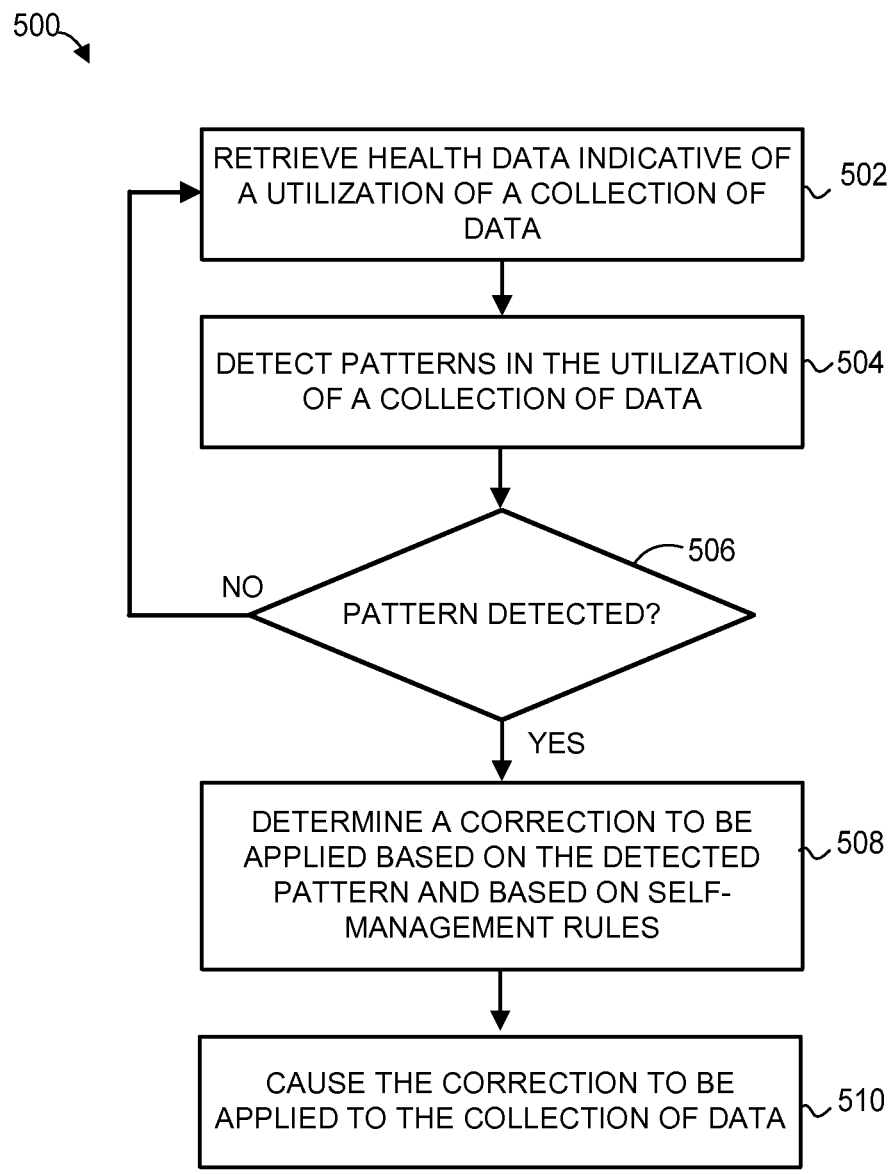
FIG. 5 is a flow diagram of an example method for self-managing one or more collections of data which can be implemented in the computing environment illustrated in FIG. 1.

FIG. 5 is a flow diagram of an example method 500 for self-managing a collection of data, such as one or more of the collections of data 110a-110p. The method 500 may be implemented by the self-management server 108, for example.

In the example method 500, health data indicative of the utilization of one or more collections of data may be retrieved (block 502). In some implementations, the self-management server 108 may retrieve the health data from one or more health data servers, such as the health data server 127. In particular, the self-management server 108 may retrieve health data indicative of the performance, execution, initialization, termination, or general operation of applications, such as e-commerce, web-based, etc. applications, utilizing the data collections 110a-110p. Further, the self-management server 108 may retrieve health data indicative of access to, storage of, deletion of, modification of, manipulation of, etc. data in the data collections 110a-110p. By way of example and without limitation, the retrieved health data may include data that indicate: (i) times corresponding to initializations of applications, completions of web or other user processes, errors, etc.; (ii) amounts of data used, data transferred, memory used, processor cyles/time used, data stored, etc. during the execution of applications; (iii) types of errors, outputs, configurations, parameters, etc. utilized or generated during the execution of applications; (iv) sizes or structures of data in the data collections 110a-110p; and (v) configurations of databases (page sizes, security setting, allocated spaces, etc.) or other structures used to store data in the data collections 110a-110p. This data may be represented in any suitable formats including plain text, numbers, symbols, codes, tables, graphs, plots, lists, arrays, documents, images, etc.

The self-management server 108 may retrieve the health data periodically (e.g., every hour, day, or week) or at any other pre- or otherwise determined times, and the self-management server 108 may gather health data indicative of the usage of the data collections 110a-110p over any suitable time period, such as the last hour, day, week, etc. Further, one or more of the data services manager devices 102 or the database administrator devices 104 may manually trigger some implementations of the self-management server 108 to retrieve health data and subsequently detect patterns in the health data, as discussed below, via the network 112.

Returning to FIG. 5, an attempt is made to detect patterns in the utilization of one or more collections of data, as indicated in the retrieved health data (block 504). For example, the learning module 126 may employ a number of specialized modules, algorithms, routines, etc. to learn and detect certain patterns in the utilization of the collections of data 110*a*-110*p*. In one scenario, the learning module 126 may utilize natural language processing techniques to analyze log files indexed, aggregated, or otherwise processed by the health data server 127. In the scenario, the learning module 126 may identify a pattern in which log files corresponding to the usage of a particular set of data (e.g., a database) include a particular error related to high data sharing costs (e.g., above a threshold data sharing cost). In another scenario, the learning module 126 may cluster log files corresponding to another set of data by using sequential or iterative clustering algorithms to identify a series of concurrency issues with the set of data.

In some cases, patterns may not be detected in the retrieved health data (block 506). In these cases, the flow of the example method 500 may revert to block 502 where additional or different health data is retrieved (e.g., possibly at a next periodic time). However, if a pattern is detected, the flow may continue to block 508 where a correction is generated based on the detected pattern and based on self-management rules, which correction is to be applied to the corresponding collection of data in response to the detected pattern.

To develop the correction corresponding to the detected pattern, the correction generator 128 may query, or otherwise access, the self-management rules 134. Specifically, the correction generator 128 may query the self-management rules 134 for any actions that are indicated as corresponding to the detected pattern. For example, as illustrated in FIG. 2, the correction generator 128 may determine (upon querying the self-management rules 134) that a correction corresponding to a detected high cost of data sharing, as described above in a scenario, includes increasing the page sizes of the database associated with the high cost of data sharing. In another example, the correction generator 128 may determine (upon querying the self-management rules 134) that a correction corresponding to detected concurrency problems associated with an application utilizing a set of data, as described above in another scenario, includes moving tables accessed by the application, providing private databases for the application, and creating tables together in a segmented table space. Generally, any number and type of corrections, such as data alterations, alterations of the structure of data, modifications of SQL scripts, modifications of applications accessing data collections, etc. may be determined in response to a detected pattern.

The determined correction may be applied to the collection of data corresponding to the detected pattern (block 510), in some implementations. The action module 122 and/or the correction generator 128 may complete one or more of the actions indicated in the self-correction rules as corresponding to the detected pattern. For example, if the indicated correction includes increasing page sizes, the self-management engine 118 may trigger the action module 122 to increase the page sizes of one or more databases (e.g., by a pre-defined increment or increment indicated in the self-management rules 134). Further, in some or all cases, the self-management engine may generate and communicate an indication of the completed action to one or more of the data services manager devices 102 and/or the database administrator devices 104. This communication may be an email, text message (e.g., short message service message), mobile alert (e.g., PUSH alert), etc.

Although not indicated in FIG. 5, some methods implemented by the self-management server 108 may include obtaining approval for a correction before completing or applying the correction to a collection of data, such as one of the collections of data 110*a*-110*p*. In other words, upon identifying or determining a correction to be applied in response to a detected pattern, the self-management engine 118 may send an indication of the determined correction to one or more of the data services manager devices 102 and/or the database administrator devices 104 before applying or completing the correction. In these implementations, the self-management engine 118 may only apply or complete the correction (alter data, modify database structures, modify SQL queries utilized by applications, etc.) upon receiving approval in response to communication with the data services manager devices 102 and/or the database administrator devices 104.

The communication/approval process included in some example methods utilized by the self-management engine 118 may include any number of types of communications and approvals. For example, the self-management engine 118 may cause an email to be sent to one or more of the data services manager devices 102 and/or the database administrator devices 104, which email includes an indication of the correction determined in response to the detected pattern. Operators of the data services manager devices 102 and/or the database administrator devices 104 may then approve or deny the indicated correction by replying to the email, visiting a website generated and served by the self-management server 108, accessing the self-management server 108 via a suitable interface (e.g., a terminal interface), etc. Generally the communication and approval of corrections may include the generation and utilization of any number of emails, text messages, mobile alerts, web pages, or other types of communications or interfaces.

Although techniques for self-management of data collections may include detecting patterns in a one or more data collections and subsequently generating corrections corresponding to those detected patterns, as described above with reference to the example method 500, techniques utilized by self-management servers, such as the self-management server 108, may also include maintaining compliance with generated corrections over time. That is, some example methods may include detecting a pattern in a certain data collection, generating a correction in response to that detected pattern, and, pending approval, applying the correction to multiple other data collections. Further, in some implementations, this applied correction may be maintained in the multiple data collections over time via deviation detection scripts such that the detected pattern is prevented or otherwise mitigated over time.

Figure 6:
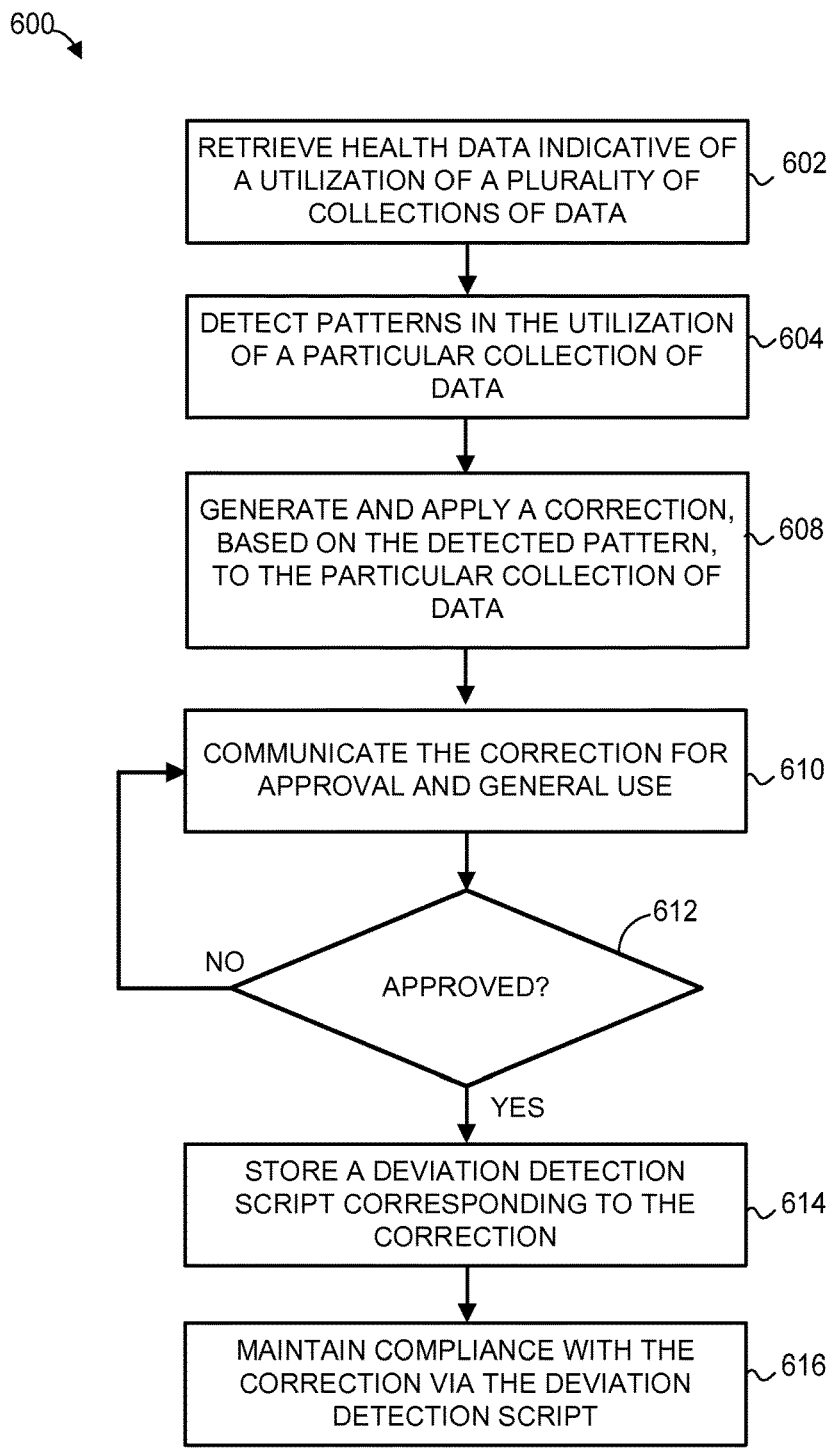
FIG. 6 is a flow diagram of an example method for maintaining compliance which can be implemented in the computing environment illustrated in FIG. 1.

FIG. 6 is a flow diagram of an example method 600 for generating a correction and, pending approval, applying that correction as appropriate to a plurality of data collections, such as the collections of data 110*a*-110*p*. The method 600 may be implemented by the self-management server 108, for example.

In the example method 600, as in the example method 500, health data indicative of the utilization of a plurality of collections of data is retrieved and patterns are detected in the utilization of a particular collection of data (blocks 602 and 604). For example, the self-management server 108 may analyze health data (e.g., detect patterns in health data) for each of the collections of data 110*a*-110*p*, for each of a number of applications utilizing the collections of data 110*a*-110*p*, or for each of the collections of data 110*a*-110*p* or applications utilizing the collections of data 110*a*-110*p* until a pattern is detected or until all retrieved health data is analyzed. In any event, a pattern may be detected in the usage of at least one of the collections of data 110*a*-110*p* (e.g., a "particular" collection of data).

Based on the detected pattern corresponding to the particular collection of data and self-management rules, such as the self-management rules 134, a correction may be generated and applied to the particular collection of data (block 608). As discussed above, this correction may include various actions (e.g., altering of data or database structures) along with various communications to/from data services manager devices and database administrator devices.

Specifically, in the method 600, an indication of the correction is communicated to one or more remote computing devices for approval and general use (block 610). The self-management server 108 may communicate an indication that a correction has been generated and/or an indication that a correction has been applied to the particular collection of data to one or more of the data services manager devices 102 and/or the database administrator devices 104. By way of example, this communication, which may include any number of emails, text messages, mobile alerts, web pages, etc., may include: (i) information about the detected pattern corresponding to the generated correction; (ii) information about the generated correction, such as a type of correction ("increase page sizes," "Set LOCKMAX 0," etc.); (iii) information about the particular collection of data corresponding to the generated correction; (iv) indications of the self-management rules utilized in generating the correction; and (v) any other suitable information about the process of generating or applying the correction. This information communicated to the data services manager devices 102 and/or the database administrator devices 104 may be represented in a variety formats for communication including, for example, passages of text (database names, descriptions of generated corrections, descriptions of self-management rules, etc.), numerical values indicative of a pattern (timestamps, amounts of data, etc.), images (e.g., graphs, plots, tables, etc. illustrating patterns), and links to web pages or other interfaces allowing recipients to investigate patterns or corrections and/or approve corrections for general use.

Generally, the self-management server 108 may communicate may communicate information about the generated, and in some cases applied, correction to the data services manager devices 102 and/or the database administrator devices 104 such that operators of the data services manager devices 102 and/or the database administrator devices 104 may review the generated correction. Specifically, the information communicated to the data services manager devices 102 and/or the database administrator devices 104 may inform the operators of the data services manager devices 102 and/or the database administrator devices 104 such that the operators can determine if the correction should be applied to collections of data other than the particular collection of data.

To illustrate this process, an example scenario may include detecting a pattern of high data sharing costs in a first collection of data, "Data Collection 1." As such, the correction generator 128 may generate a correction including increasing page sizes of "Data Collection 1," based on the self-management rules 134, and the self-management engine 118 may trigger the action module 122 to apply the correction to "Data Collection 1" (i.e., increase page sizes in "Data Collection 1"). Subsequently, the self-management server 108 may communicate an email to at least some of the data services manager devices 102, in the example scenario. This example email may include a text description of the correction (e.g., "Increase page size"), the detected pattern that triggered the correction (e.g., "High cost of data sharing"), and the collection of data to which the correction was applied (e.g., "Data Collection 1"). The email may also include various values including a timestamp at which the correction was applied, timestamps corresponding to retrieved health data, and amounts of data sharing or other measures of the "High cost of data sharing" (e.g., in comparison to data sharing corresponding to other collections of data).

The information included in the example email, in this scenario, may allow operators of the data services manager devices 102 to determine if the correction of increasing page sizes should be applied to other collections of data such that future costs of data sharing are reduced, for example. The operators may determine that in addition to "Data Collection 1," the self-management server 108 should increase the page size of all or at least some other data collections stored on the same or different data storage devices in the computing environment 100. For example, the operators may determine, based on the communicated information in this scenario, that page sizes should be increased for all data collections on all of the data storage devices 106*a*-106*p* or a subset of the data storage devices 106*a*-106*p*.

Returning to FIG. 6, if the generated correction is "approved" for application to other collections of data (block 612), the flow may continue to block 614. However, if the correction is not approved for general use (e.g., for application to other collections of data), the flow may revert to block 602 whereas further health data may be analyzed to detect patterns.

The approval, denial, and/or other responses to the communications of block 610 may include any number and type of responses communicated to the self-management server 108. For example, when the communication of block 610 includes an email, operators of the data services manager devices 102 may reply to the email, forward the email to one of a number of email addresses (e.g., one for approval and one for denial of the correction for general use), select (e.g., via a click or tap) one or more hyperlinks in the email, etc., all of which actions may be electronically communicated in a suitable manner to the self-management server 108 via the network 112. In other cases, operators may interact with one or more interfaces, such as web portals, web pages, terminal interfaces, etc., to provide indications to the self-management server 108 of approval, denial, or other responses to the communication of block 610.

If "approved" for general use (e.g., for application to data collections other than the data collection corresponding to the detected pattern), a deviation detection script corresponding to the generated correction may be stored (block 614). The self-management server 108 may generate this deviation detection script automatically based on the previously generated/applied correction and the self-management rules 134, in some implementations. In other implementations, operators of the data services manager devices 102 and/or the database administrator devices 104 may, at least partially, configure the deviation detection script, e.g., as part of the response to the communication of block 610 (e.g., via various web portals or terminal interfaces). In any event, the self-management server 108 may store a deviation detection script corresponding to the generated/applied correction (e.g., in the deviation detection scripts 128).

The self-management server 108 or operators of the data services manager devices 102 and/or the database administrator devices 104 may configure the stored deviation detection script such that, when executed, the stored deviation detection script queries a plurality of collections of data to determine if the generated correction (e.g., generated at block 608) needs to be applied to one or more of the plurality of collections of data. For example, in the scenario described above, a deviation detection script may query the collections of data 110a-110p to determine if the pages sizes of the collections of data 110a-110p are below a threshold page size (e.g., defined in the self-management rules 134 utilized to generate the correction at block 608). This sort of detection may occur periodically, or otherwise, along with a plurality of other deviation detections as discussed further in U.S. patent application Ser. No. 14/483,553. If deviations are detected, an action module, such as the action module 122 may be triggered to correct the deviation in a similar manner to the correction applied to the particular collection of data at block 608. Thus, compliance with the generated correction may be maintained via the stored deviation detection script (block 616).

Although the above scenario illustrated a single deviation detection script being stored and utilized to maintain compliance, any number of deviation detection scripts may be generated in response to detected patterns and automatically generated corrections in one or more collections of data. For example, two differing patterns may be detected in two different collections of data. Subsequently, two corrections may be automatically generated an applied to the two different collections of data and, upon approval, two different deviation detection scripts may be stored to maintain compliance with the two corrections over time. In other examples, one detected pattern may initiate multiple corrections and the storage of multiple deviation detection scripts, and multiple detected patterns may initiate fewer corrections or the storage of fewer deviation detection script, or even one correction or one deviation detection scripts.

Additional Considerations

Upon reading this disclosure, those of ordinary skill in the art will appreciate still additional alternative structural and functional designs for system and a method for automatic governance of data or software applications. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

We claim:

1. A method comprising:
retrieving, by a self-management engine from a data storage device, health data indicative of a utilization of a collection of data by one or more computing devices;
identifying, by analyzing the health data, one or more errors occurring while an application utilizes the collection of data over a first period of time;
learning, by analyzing one or more log files generated while the application utilizes the collection of data over the first period of time, a new pattern in the utilization of the collection of data, the pattern associated with the occurrence of errors;
detecting, by the self-management engine, the learned pattern in a utilization of the collection of data over a second period of time;
automatically determining, by the self-management engine, a correction to be applied to the collection of data based on the detected pattern and based on one or more rules corresponding to the detected pattern;
causing, by the self-management engine, the correction to be applied to the collection of data;
transmitting, from the self-management engine to a remote computing device, an indication of the correction to be applied to the collection of data; and
in response to the transmission of the indication of the correction, receiving, at the self-management engine, an approval of the correction;
and in response to receiving the approval, causing, by the self-management engine, a deviation detection script to be stored, wherein the deviation detection script is to be executed at future times to detect the pattern;
wherein causing the correction to be applied to the collection of data is in response to receiving the approval of the correction.

2. The method of claim 1, wherein detecting the pattern includes:
analyzing errors of the collection of data with the learning module to identify the pattern with a corresponding confidence value,
analyzing, with the learning module, other portions of the health data to iteratively update the corresponding confidence value, and
determining, based on the updated corresponding confidence value, that the pattern is detected.

3. The method of claim 1, wherein automatically determining the correction to be applied to the collection of data includes:
matching the detected pattern to the one or more rules, stored on a data storage device, wherein each of the one or more rules indicates an action to take to correct the collection of data when the pattern is detected, and
generating, based on the one or more rules, the correction to be applied to the the collection of data, wherein the correction includes at least some of the actions indicated by the one or more rules.

4. The method of claim 1, wherein the health data includes one or more performance metrics measuring the utilization of the collection of data.

5. The method of claim 1, wherein the collection of data includes a structure and various data entries within the structure, and wherein causing the correction to be applied to the collection of data including altering at least one of the structure or the various data entries within the structure.

6. The method of claim 1, wherein causing the correction to be applied to the at least one of the collection of data includes causing the correction to be applied to both the collection of data and the one or more applications.

7. The method of claim 6, wherein the one or more applications include one or more queries of the collection of data, and wherein causing the correction to be applied to the one or more applications including modifying the queries of the collection of data.

8. The method of claim 1, wherein the health data includes logs of errors generated in the utilization of the collection of data.

9. The method of claim 1, wherein the pattern includes a repetition of an event, wherein the event occurs during the utilization of the collection of data.

10. The method of claim 1, wherein the pattern includes a change in or characteristic of a performance of the one or more applications during the utilization of the collection of data.

11. A system comprising:
a non-transitory computer-readable medium storing instructions thereon; and
one or more processors specially configured by the instructions stored on the non-transitory computer-readable medium to:
receive health data indicative of a utilization of a collection of data by one or more computing devices executing one or more applications,
identify, by analyzing the health data, one or more errors occurring while one of the one or more applications utilizes the collection of data over a first period of time;
learn, by analyzing one or more log files generated while the application utilizes the collection of data over the first period of time, a new pattern in the utilization of the collection of data, the pattern associated with the occurrence of errors;
detect the learned pattern in the utilization of the collection of data over a second period of time,
automatically determine a correction to be applied to at least one of the collection of data or the one or more applications based on the detected pattern and based on one or more rules corresponding to the detected pattern, and
cause the correction to be applied to the collection of data;
transmit, to a remote computing device, an indication of the correction to be applied to the collection of data; and
receive, in response to the transmission of the indication of the correction, an approval of the correction;
cause, in response to receiving the approval, a deviation detection script to be stored, wherein the deviation detection script is to be executed at future times to detect the pattern;
wherein causing the correction to be applied to the collection of data is in response to receiving the approval of the correction.

12. The system of claim 11, wherein the health data includes logs of errors generated in the utilization of the collection of data.

13. The system of claim 7, wherein the health data includes one or more performance metrics measuring the utilization of the collection of data.

14. The system of claim 11, wherein the collection of data includes a structure and various data entries within the structure, and wherein causing the correction to be applied to the collection of data including altering at least one of the structure or the various data entries within the structure.

15. The system of claim 11, wherein causing the correction to be applied to the collection of data includes causing the correction to be applied to both the collection of data and the one or more applications.

16. The system of claim 15, wherein the one or more applications include one or more queries of the collection of data, and wherein causing the correction to be applied to the one or more applications including modifying the queries of the collection of data.

17. The system of claim 11, wherein the pattern includes at a repetition of an event, wherein the event occurs during the utilization of the collection of data.

18. The system of claim 11, wherein the pattern includes a change in or characteristic of a performance of the one or more applications during the utilization of the collection of data.

19. The system of claim 11, wherein detecting the pattern includes:
analyzing errors of the collection of data with the learning module to identify the pattern with a corresponding confidence value,
analyzing, with the learning module, other portions of the health data to iteratively update the corresponding confidence value, and
determining, based on the updated corresponding confidence value, that the pattern is detected.

20. The system of claim 11, wherein automatically determining the correction to be applied to the collection of data includes:
matching the detected pattern to the one or more rules, stored on a data storage device, wherein each of the one or more rules indicates an action to take to correct the collection of data when the pattern is detected, and
generating, based on the one or more rules, the correction to be applied to the collection of data, wherein the correction includes at least some of the actions indicated by the one or more rules.

* * * * *